Patented Aug. 30, 1932

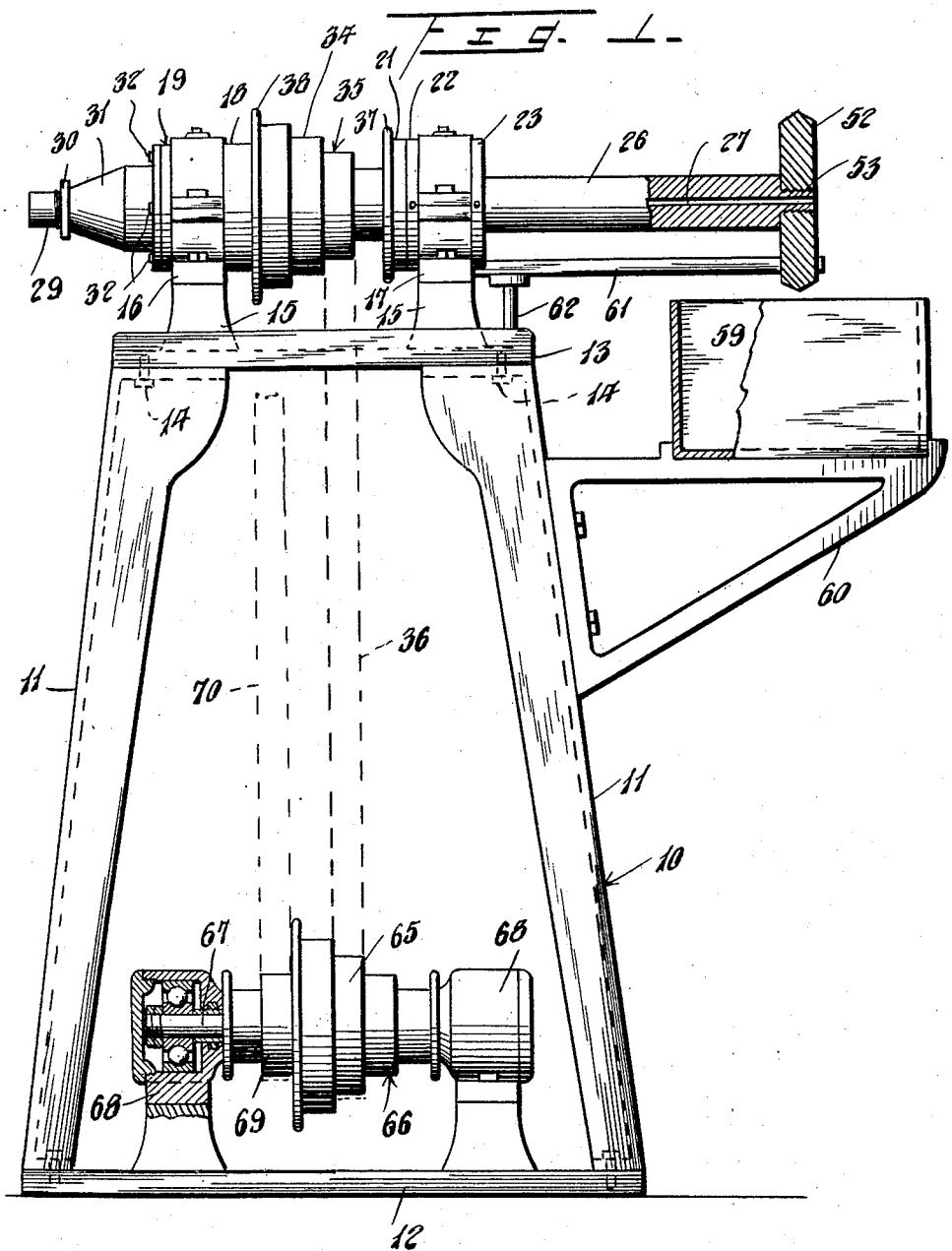

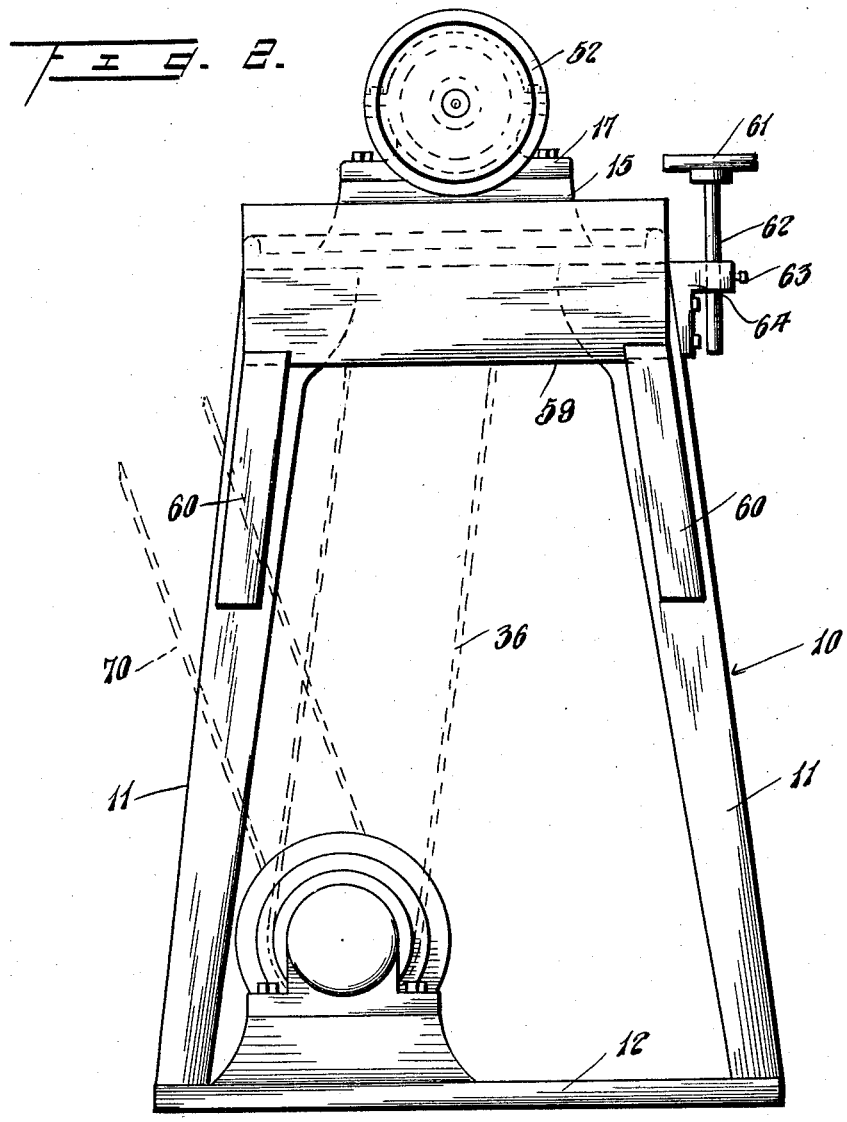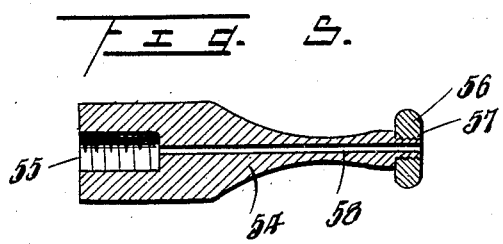

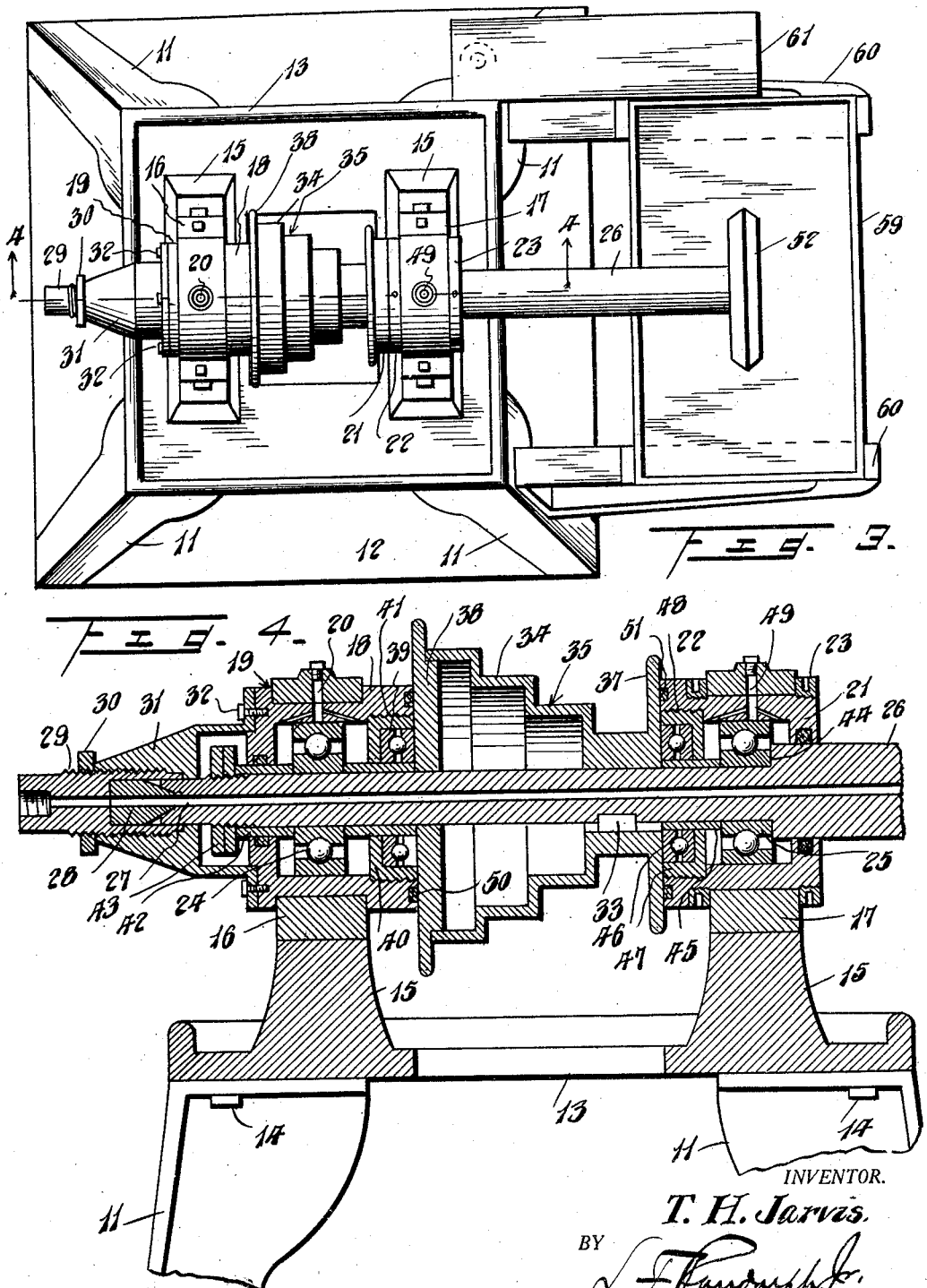

1,874,755

UNITED STATES PATENT OFFICE

TOM H. JARVIS, OF WEST HUNTINGTON, WEST VIRGINIA

PULLEY AND MOUNTING FOR GLASS CUTTING LATHES

Application filed May 9, 1929, Serial No. 361,747. Renewed April 7, 1932.

This invention relates to a glass cutting lathe or a lathe adapted to turn a stone, which cuts glass manually held and moved with respect to the stone.

It is aimed to provide an efficient machine for the aforesaid purpose which will operate very steadily, is well balanced and substantially free of end play.

Another object is to provide a novel construction wherein the balancing of the tool operating spindle is controlled by a novel form of pulley mounted thereon and through which it is driven from a source of power.

It is further aimed to provide a novel construction or mounting means for the aforesaid spindle.

Various additional objects and advantages will become apparent from a consideration of the description following taken in connection with accompanying drawings, wherein:

Figure 1 is a view of the lathe in side elevation,

Figure 2 is a view of the lathe in end elevation,

Figure 3 is a plan view of the lathe,

Figure 4 is an enlarged section taken on line 4—4 of Figure 3, and

Figure 5 is a detail longitudinal section of a holder for stones of small size.

Referring specifically to the drawings, the lathe includes a conventional skeleton mounting frame 10 having upwardly and inwardly converging legs at 11, a base at 12, and a crown or bed plate 13, removably bolted to the legs 11 as at 14.

Integral with the plate 13 are supporting members 15 which detachably mount separable or sectional bearings 16 and 17.

A relatively stationary drum 18 has an annular groove 19 interfitting with the bearing 16 and such bearing and drum have alined openings at 20 for the application of lubricant.

A relatively thick but longitudinally adjustable drum 21 extends through the bearing 17, having rings 22 and 23 threaded to such drum and adapted to engage opposite sides of the bearing. The rings 22 and 23 may be adjusted together with the drum 21, to control the position of the latter longitudinally of the lathe.

Disposed within the drums 18 and 21 are ball bearing cages 24 and 25 of identical construction. Journaled in each of the bearings 24 and 25 is a tool spindle 26. Such spindle has a central passageway 27 through which water may be passed from any suitable source, the inner end of such spindle being seated on a stone 28 held in place by a nipple 29 and a coacting nut 30 thereon bearing against a cap 31 which is bolted as at 32 to the drum 18. The element 28 and nipple 29 are provided with longitudinal passages in registration with that at 27.

Keyed as at 33 to the spindle 26, is a combination balanced wheel and stepped driving pulley 34. Such pulley 34 has steps or portions 35 which are engageable by a driving belt as at 36, selectively, in order to drive the spindle 26 at desired speed. For the most part, the said pulley 34 is machined both externally and internally in order to balance the same so that it in turn will balance the motion of the spindle 26, enabling it to operate with minimum vibration. Integral with the pulley 34 at one end is a flange 37 while the other end is closed by a closure plate or disk 38, which is press-fitted into the larger element 35 of the pulley 34.

A thrust bearing for the pulley 34 and spindle 26 is provided at 39, being carried by a retainer 40 which is screw threaded as at 41 to the interior of the drum 18. Spacing sleeves 42 loosely surround the spindle 26 and abut opposite sides of the bearings 24, one of them also abutting the disk 38 and the other in turn being engaged by one or more nuts as at 33 screw threaded on the spindle, such nuts serving to supply the appropriate pressure to the spacing elements 42 and associated parts.

The spindle 26 has its larger portion journaled in the front wall of the drum 21 and inwardly of the same is provided with a shoulder 44 which abuts the bearing 25. A spacing sleeve 45 abuts the other side of said bearing and also abuts the flange 37. Surrounding the sleeve 45 and abutting said flange is a thrust bearing 46 which is carried by a retainer 47 screw threaded as at 48 to the drum 21.

The bearing 17 and drum 21 have registering lubricant passages at 49. In order to prevent the escape of lubricant from the drums and bearings associated therewith, drum 18 carries a gasket 50 which is in wiping contact with the disk 38 and drum 21 carries a gasket 51 which is in wiping contact with the flange 37.

At the forward end a suitable stone 52 is screw threaded to the spindle 26 as at 53. Obviously the stone may be of any size or shape desired. If a smaller one than that shown at 52 is desired, a holder 54 may be screw threaded at 55 to the screw threads 53 and at its outer end have the smaller stone 56 screw threaded thereto at 57, such holder 54 having a water passageway 58 therethrough which is in registry with the passage 27.

In using the machine, the operator holds the glass article to be cut, and moves the same relative to the stone 52, 56 or the like and the constantly supplied water passes from the passageway 27 into a receiving trough 59 which may be supported in any desired manner as by means of brackets 60 attached to the legs 11.

An arm rest for use of the operator is shown conventionally at 61 and is preferably adjustable, to which end it has a depending rod 62 adjustably clamped at 63 in a bracket 64 fastened to one of the legs 11.

The belt 36 may be driven from any suitable source of power. For instance it may coact with the steps 65 of a pulley 66 identical with that at 34 and is carried by a counter shaft 67 appropriately mounted in bearings 68 supported on the base 12. Shaft 67 also has a stepped pulley 69 keyed thereto over which a drive belt 70 is trained, such belt 70 being driven by any suitable source of power.

Various changes may be resorted to provided they fall within the spirit and scope of the invention.

I claim as my invention:—

1. A spindle bearing assembly having a tool-carrying spindle, bearing members, drums carried by said members, bearing devices in the drums, said spindle being journaled in said bearing devices, a balanced driving pulley keyed to the spindle and located between said devices, a cap on one of said drums, a nipple on said cap, and a bearing device in said nipple in bearing engagement with the inner end of the spindle.

2. A spindle bearing assembly comprising a bed, integral supports thereon, a sectional bearing carried by said support, drums fitted to said bearing, one of said drums having rings screw threaded thereto and engaging opposite sides of the adjacent bearing to permit the drums to be adjusted longitudinally, a balanced pulley of hollow formation disposed intermediate the drums and contacting with one of them, thrust bearings carried by the drums and engaging the opposite ends of the pulley, bearing devices within the drums, a tool-carrying spindle journaled in said bearing devices, said spindle having a shoulder abutting one of said devices, a spacing sleeve on the spindle between the other side of the last mentioned device and the adjacent end of the pulley, spacing sleeves on opposite sides of the other bearing device, one engaging the adjacent end of the pulley, a nut on the spindle engaging the opposite end of the other sleeve.

In testimony whereof I affix my signature.

TOM H. JARVIS.